United States Patent
Ko et al.

(10) Patent No.: US 8,254,329 B2
(45) Date of Patent: Aug. 28, 2012

(54) METHOD AND APPARATUS FOR TRANSMITTING REFERENCE SIGNAL, SETTING REFERENCE SIGNAL TRANSMISSION PATTERN, AND SETTING AND ALLOCATING RESOURCE BLOCK

(75) Inventors: Hyun Soo Ko, Anyang-si (KR); Bin Chul Ihm, Anyang-si (KR); Jae Won Chang, Anyang-si (KR); Moon Il Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 538 days.

(21) Appl. No.: 12/448,170

(22) PCT Filed: Dec. 12, 2007

(86) PCT No.: PCT/KR2007/006478
§ 371 (c)(1), (2), (4) Date: Jun. 11, 2009

(87) PCT Pub. No.: WO2008/072899
PCT Pub. Date: Jun. 19, 2008

(65) Prior Publication Data
US 2010/0014481 A1   Jan. 21, 2010

(30) Foreign Application Priority Data
Dec. 12, 2006 (KR) .................. 10-2006-0126399

(51) Int. Cl.
*H04W 4/00* (2009.01)

(52) U.S. Cl. ........ 370/330; 370/208; 370/338; 370/341; 370/436; 370/437; 455/450; 455/507; 375/260

(58) Field of Classification Search .......... 370/208–210, 370/328–330, 338, 341, 431, 436, 437; 375/260; 455/450, 451, 452, 507
See application file for complete search history.

(56) References Cited

U.S. PATENT DOCUMENTS

| 7,248,559 | B2 * | 7/2007 | Ma et al. ........................ 370/208 |
| 2002/0136187 | A1 * | 9/2002 | Aoyama et al. ................ 370/342 |
| 2003/0060165 | A1 | 3/2003 | Horisaki |
| 2004/0258014 | A1 | 12/2004 | Ro et al. |
| 2005/0094550 | A1 | 5/2005 | Huh et al. |
| 2006/0028976 | A1 | 2/2006 | Park et al. |
| 2010/0254354 | A1 * | 10/2010 | Sutivong et al. .............. 370/334 |

FOREIGN PATENT DOCUMENTS

EP   1 246 423   10/2002

* cited by examiner

*Primary Examiner* — Christopher Grey
(74) *Attorney, Agent, or Firm* — McKenna Long & Aldridge LLP

(57) ABSTRACT

A method for transmitting a reference signal, a method for establishing a reference-signal transmission pattern, and a method for establishing a block are disclosed. The reference-signal density is adjusted according to the request degree of the channel estimation performance, and then the reference signal is transmitted to a destination. As a result, the apparatus prevents resources from being unnecessarily wasted, and acquires a high channel estimation performance as necessary, resulting in an increased production yield of a system.

13 Claims, 19 Drawing Sheets

▨ : Allocation band

▨ : Allocation band

▨ : Allocation band

R : reference signal
D : data

R : reference signal
D : data

R : reference signal
D : data

: Mandatory Reference Symbol
R : reference signal
D : data

[Rₘ] : Mandatory Reference Symbol

[Rₕ] : Reference Symbol for High Quality Channel Estimation

R : reference signal
D : data

FIG. 10A

| R_M1 | R_M2 | D | D | D | D | R_M1 | R_M2 | D | D | D | D |
|---|---|---|---|---|---|---|---|---|---|---|---|
| D | D | D | D | D | D | D | D | D | D | D | D |
| D | D | D | D | D | D | D | D | D | D | D | D |
| D | D | D | D | D | D | D | D | D | D | D | D |
| D | D | D | D | D | D | D | D | D | D | D | D |
| D | D | D | D | D | D | D | D | D | D | D | D |
| R_M1 | R_M2 | D | D | D | D | R_M1 | R_M2 | D | D | D | D |
| D | D | D | D | D | D | D | D | D | D | D | D |
| D | D | D | D | D | D | D | D | D | D | D | D |
| D | D | D | D | D | D | D | D | D | D | D | D |
| D | D | D | D | D | D | D | D | D | D | D | D |
| D | D | D | D | D | D | D | D | D | D | D | D |
| R_M1 | R_M2 | D | D | D | D | R_M1 | R_M2 | D | D | D | D |
| D | D | D | D | D | D | D | D | D | D | D | D |

Horizontal axis: Subcarrier
Vertical axis: OFDM Symbol

- [R_M1] : Mandatory Pilot for 1st Antenna
- [R_M2] : Mandatory Pilot for 2nd Antenna
- [R_H1] : Additional Pilot for 1st Antenna
- [R_H2] : Additional Pilot for 2nd Antenna R : reference signal
D : data FIG. 10B
[Grid diagram showing OFDM Symbol (vertical) vs Subcarrier (horizontal) with pilot and data allocations]
 : Mandatory Pilot for 1st Antenna
 : Mandatory Pilot for 2nd Antenna
 : Additional Pilot for 1st Antenna
 : Additional Pilot for 2nd Antenna
R : reference signal
D : data

FIG. 11A

| R$_{M1}$ | D | D | D | D | D | R$_{M1}$ | D | D | D | D | D |
|---|---|---|---|---|---|---|---|---|---|---|---|
| R$_{M2}$ | D | D | D | D | D | R$_{M2}$ | D | D | D | D | D |
| D | D | D | D | D | D | D | D | D | D | D | D |
| D | D | D | D | D | D | D | D | D | D | D | D |
| D | D | D | D | D | D | D | D | D | D | D | D |
| D | D | D | D | D | D | D | D | D | D | D | D |
| R$_{M1}$ | D | D | D | D | D | R$_{M1}$ | D | D | D | D | D |
| R$_{M2}$ | D | D | D | D | D | R$_{M2}$ | D | D | D | D | D |
| D | D | D | D | D | D | D | D | D | D | D | D |
| D | D | D | D | D | D | D | D | D | D | D | D |
| D | D | D | D | D | D | D | D | D | D | D | D |
| D | D | D | D | D | D | D | D | D | D | D | D |
| R$_{M1}$ | D | D | D | D | D | R$_{M1}$ | D | D | D | D | D |
| R$_{M2}$ | D | D | D | D | D | R$_{M2}$ | D | D | D | D | D |

Subcarrier (horizontal), OFDM Symbol (vertical)

- R$_{M1}$ : Mandatory Pilot for 1st Antenna
- R$_{M2}$ : Mandatory Pilot for 2nd Antenna
- R$_{H1}$ : Additional Pilot for 1st Antenna
- R$_{H2}$ : Additional Pilot for 2nd Antenna R : reference signal
D : data

FIG. 11B

| | | | | | | | | | | | |
|---|---|---|---|---|---|---|---|---|---|---|---|
| R<sub>M1</sub> | D | D | D | D | D | R<sub>M1</sub> | D | D | D | D | D |
| R<sub>M2</sub> | D | D | D | D | D | R<sub>M2</sub> | D | D | D | D | D |
| D | D | D | D | D | D | D | D | D | D | D | D |
| D | D | D | R<sub>H1</sub> | D | D | D | D | D | R<sub>H1</sub> | D | D |
| D | D | D | R<sub>H2</sub> | D | D | D | D | D | R<sub>H2</sub> | D | D |
| D | D | D | D | D | D | D | D | D | D | D | D |
| R<sub>M1</sub> | D | D | D | D | D | R<sub>M1</sub> | D | D | D | D | D |
| R<sub>M2</sub> | D | D | D | D | D | R<sub>M2</sub> | D | D | D | D | D |
| D | D | D | D | D | D | D | D | D | D | D | D |
| D | D | D | R<sub>H1</sub> | D | D | D | D | D | R<sub>H1</sub> | D | D |
| D | D | D | R<sub>H2</sub> | D | D | D | D | D | R<sub>H2</sub> | D | D |
| D | D | D | D | D | D | D | D | D | D | D | D |
| R<sub>M1</sub> | D | D | D | D | D | R<sub>M1</sub> | D | D | D | D | D |
| R<sub>M2</sub> | D | D | D | D | D | R<sub>M2</sub> | D | D | D | D | D |

Subcarrier (horizontal), OFDM Symbol (vertical)

$R_{M1}$ : Mandatory Pilot for 1st Antenna
$R_{M2}$ : Mandatory Pilot for 2nd Antenna
$R_{H1}$ : Additional Pilot for 1st Antenna
$R_{H2}$ : Additional Pilot for 2nd Antenna R : reference signal
D : data

FIG. 12A

☐ $R_{M1,2}$ : Code Divisional Mandatory Pilot for 1st and 2nd Antenna

R : reference signal
D : data

FIG. 12B

|     | → Subcarrier |   |   |   |   |   |   |   |   |   |   |
|-----|-----|-----|-----|-----|-----|-----|-----|-----|-----|-----|-----|
| $R_{M1,2}$ | D | D | $R_{H1,2}$ | D | D | $R_{M1,2}$ | D | D | $R_{H1,2}$ | D | D | $R_{M1,2}$ |
| D | D | D | D | D | D | D | D | D | D | D | D |
| D | D | D | D | D | D | D | D | D | D | D | D |
| $R_{H1,2}$ | D | D | $R_{M1,2}$ | D | D | $R_{H1,2}$ | D | D | $R_{M1,2}$ | D | D | $R_{H1,2}$ |
| D | D | D | D | D | D | D | D | D | D | D | D |
| D | D | D | D | D | D | D | D | D | D | D | D |
| $R_{M1,2}$ | D | D | $R_{H1,2}$ | D | D | $R_{M1,2}$ | D | D | $R_{H1,2}$ | D | D | $R_{M1,2}$ |
| D | D | D | D | D | D | D | D | D | D | D | D |
| D | D | D | D | D | D | D | D | D | D | D | D |
| $R_{H1,2}$ | D | D | $R_{M1,2}$ | D | D | $R_{H1,2}$ | D | D | $R_{M1,2}$ | D | D | $R_{H1,2}$ |
| D | D | D | D | D | D | D | D | D | D | D | D |
| D | D | D | D | D | D | D | D | D | D | D | D |
| $R_{M1,2}$ | D | D | $R_{H1,2}$ | D | D | $R_{M1,2}$ | D | D | $R_{H1,2}$ | D | D | $R_{M1,2}$ |
| D | D | D | D | D | D | D | D | D | D | D | D |
| D | D | D | D | D | D | D | D | D | D | D | D |
| $R_{H1,2}$ | D | D | $R_{M1,2}$ | D | D | $R_{H1,2}$ | D | D | $R_{M1,2}$ | D | D | $R_{H1,2}$ |
| D | D | D | D | D | D | D | D | D | D | D | D |
| D | D | D | D | D | D | D | D | D | D | D | D |
| $R_{M1,2}$ | D | D | $R_{H1,2}$ | D | D | $R_{M1,2}$ | D | D | $R_{H1,2}$ | D | D | $R_{M1,2}$ |

(Vertical axis: OFDM Symbol)

$R_{M1,2}$ : Code Divisional Mandatory Pilot for 1st and 2nd Antenna $R_{H1,2}$ : Code Divisional Additional Pilot for 1st and 2nd Antenna R : reference signal
D : data

METHOD AND APPARATUS FOR TRANSMITTING REFERENCE SIGNAL, SETTING REFERENCE SIGNAL TRANSMISSION PATTERN, AND SETTING AND ALLOCATING RESOURCE BLOCK

This application claims priority to International Application No. PCT/KR2007/006478, filed Dec. 12, 2007 and Korean Patent Application No. 10-2006-0126300, filed Dec. 12, 2006, both of which are hereby incorporated by reference for all purposes as if fully set forth herein.

TECHNICAL FIELD

The present invention relates to a communication system, and more particularly to a method and apparatus for transmitting a reference signal to adjust a reference-signal density according to conditions of a user's channel estimation request, a method and apparatus for setting a reference-signal transmission pattern, and a method and apparatus for setting/allocating the resource block.

BACKGROUND ART

The present invention can be applied to an orthogonal frequency division multiplexing (OFDM) communication system scheme. A conventional OFDM communication system will hereinafter be described in detail.

FIG. 1 is a block diagram illustrating a transmission end for use in the conventional OFDM communication system.

According to the basic principles of the OFDM scheme, the OFDM scheme divides a high-rate data stream into many slow-rate data streams, and simultaneously transmits the slow-rate data streams via many carriers. Each of the carriers is called a sub-carrier.

The orthogonality exists between many carriers of the OFDM scheme. Accordingly, although frequency components of the carrier are overlapped with each other, the overlapped frequency components can be detected by a reception end.

For this purpose, data bits to be transmitted to a reception end are mapped to data symbols by a predetermined modulation module 101. A data stream composed of data symbols is converted to several low-rate data streams by a serial to parallel (SP) converter 102. The individual sub-carriers are multiplied by the parallel data streams by the sub-carrier mapping module 103.

Each of the data streams can be mapped to a time-area signal by the Inverse Discrete Fourier Transform (IDFT) module 104. The IDFT can be effectively implemented by the Inverse Fast Fourier Transform (IFFT) module. Thereafter, the data streams can be converted into a single data stream by the parallel to serial (P/S) converter 105. The CP (Cyclic Prefix) insertion module 106 inserts the cyclic prefix (CP) in the resultant data stream, so that the symbols can be protected and transmitted.

In the case of the above-mentioned OFDM communication system, a symbol duration of the low-rate subcarrier increases, such that temporal signal dispersion (i.e., relative signal dispersion in time) generated by the multi-path delay spreading decreases.

A guard interval longer than a channel delay dispersion interval is inserted between OFDM symbols, such that inter-symbol interference can be reduced. If a duplicate of some parts of the OFDM signal is arranged at the guard interval, the OFDM symbols can be cyclically extended, resulting in the protection of the symbols.

In the meantime, an Orthogonal Frequency Division Multiple Access (OFDMA) scheme for allocating resources to a plurality of users using the above-mentioned OFDM principles will hereinafter be described in detail.

The OFDMA scheme is indicative of a multiple access method for providing individual users with some parts of sub-carriers available for the OFDM modulation system, so that it can implement the multiple access. The OFDMA scheme provides the individual users with frequency resources, and the individual frequency resources are transmitted to several users independent of each other, so that they are not generally overlapped with each other.

The above-mentioned scheme for allocating resources to several users using the OFDMA communication system will hereinafter be described.

There are a variety of general resource allocation schemes, for example, a localized resource allocation scheme, a distributed resource allocation scheme, and a resource allocation scheme based on a resource block level.

The localized resource allocation scheme allocates a neighboring frequency band to a specific user. The distributed resource allocation scheme distributes resources to several users, allocates the resources to the individual users, and alternately allocates the resources to the individual users. The resource allocation scheme based on the resource block level is considered to be the combination of the localized resource allocation scheme and the distributed resource allocation scheme.

FIG. 2 is a conceptual diagram illustrating the localized resource allocation scheme.

Referring to FIG. 2, the localized resource allocation scheme allocates the resources to the individual users, so that the resources allocated to specific user are configured to be adjacent to each other and limited to a specific frequency band of the OFDM symbol. The above-mentioned localized resource allocation scheme uses sub-carriers of similar frequency bands, so that it can selectively use a variable modulation scheme or a coding scheme according to the channel condition. However, a frequency band allocated to a specific user is limited to a predetermined-range band, so that a diversity gain on a frequency axis becomes lower as compared to the distributed resource allocation scheme.

FIG. 3 is a conceptual diagram illustrating the distributed resource allocation scheme.

The distributed resource allocation scheme is indicative of a resource allocation scheme in which a specific sub-carrier of the OFDM symbol moves to other locations according to a predetermined hopping regulation. The frequency band allocated to a specific user ranges over a frequency area wider than that of the localized resource allocation scheme, so that a frequency-axis diversity gain can be acquired. The distributed resource allocation scheme has difficulty in applying the adaptive modulation and coding schemes, which are the most suitable for the selected channel situation, to the individual users.

FIG. 4 is a conceptual diagram illustrating the resource allocation scheme based on the resource block level.

The resource allocation scheme based on the resource block level is indicative of an intermediate format between the localized resource allocation scheme and the distributed resource allocation scheme. The resource allocation scheme based on the resource block level binds neighboring sub-carriers in the form of a single block, so that the localized resource allocation or the distributed resource allocation can be conducted in block units. Indeed, the resource allocation scheme based on the resource block level can locally allocate resources to the individual users, or can distributively allocate the resources to the individual users. Substantially, the user may have difficulty in discriminating between this localized resource allocation scheme based on the resource block level and the conventional localized resource allocation scheme.

In the meantime, in the case where the OFDM communication system transmits resources to the individual users and transmits the signal to the users, the reception end performs channel estimation. A general channel estimation method and a method for transmitting a reference signal used for the channel estimation will hereinafter be described, The fading phenomenon occurs in a wireless communication system environment by a multi-path time delay. The above-mentioned channel estimation compensates for the signal distortion caused by an abrupt environment. change based on the fading phenomenon, and uses a transmission signal to the signal recovery. In order to perform the channel estimation, the wireless communication system conducts the channel estimation using the reference signal pre-recognized by a transceiver.

There are two kinds of usages of the above-mentioned reference signal under the OFDM-based wireless communication system, i.e., a first scheme in which the reference signal is allocated to all the sub-carriers of a predetermined period so that it can be transmitted as a preamble signal format to a destination, and a second scheme in which the reference signal is allocated between data sub-carriers.

In the case of using a signal (e.g., a preamble signal) composed of only the reference signal according to the first scheme, the reference signal has high density, so that the first scheme has a channel estimation performance higher that that of the second scheme.

However, the higher the reference-signal density, the lower the amount of transmission (Tx) data. In order to increase the amount of Tx data, the second scheme for allocating the reference signal between data sub-carriers is superior to the first scheme for transmitting the reference signal configured in the form of the preamble signal format. In the case of using the second scheme for allocating the reference signal between the data sub-carriers, the reference-signal density becomes lower, so that the channel estimation performance may be deteriorated. In order to solve this problem, there is needed an improved arrangement method capable of minimizing the degree of the channel estimation deterioration.

Therefore, a method for arranging the reference signal and transmitting the reference signal according to the arrangement method in the case of using the second scheme for allocating the reference signal between data sub-carriers will hereinafter be described.

If the reference signal is allocated between the data sub-carriers, the reference signal can be classified into three kinds of reference signals, i.e., a com-format reference signal, a block-format reference signal, and a lattice-format reference signal.

FIG. 5A shows the arrangement structure of the com-format reference signal for use in the OFDM system. FIG. 5B shows the arrangement structure of the block-format reference signal for use in the OFDM system. FIG. 5C shows the arrangement structure of the lattice-format reference signal for use in the OFDM system.

The above-mentioned com-format reference signal structure of FIG. 5A shows a method for transmitting the reference signal to only a specific sub-carrier every hour. This com-format reference signal structure transmits a reference signal every hour, performs interpolation of the reference signal in a frequency area every hour, and performs the channel estimation on the interpolated reference signal, so that it is inadequate for the frequency-selective channel. In other words, it is preferable that the above-mentioned com-format structure may be used for only a specific channel having a coherence frequency higher than $N_{freq}$ equal to a frequency-axis arrangement distance of the reference signal.

The above-mentioned block-format reference signal structure of FIG. 5B transmits the reference signal to all the sub-carriers during a specific period of time only. The block-format structure performs the interpolation in the time area, so that it encounters the interpolation error under a specific channel having a coherence time of more than $N_{time}$ equal to a time-axis arrangement distance of the reference signal.

The above-mentioned lattice-format reference signal format is indicative of an intermediate format between the com-format structure and the block-format structure, and arranges the reference signal in consideration of the coherence time, the coherence frequency, and the frequency efficiency based on the reference signal usage.

In other words, the lattice-format reference signal structure of FIG. 5C exemplarily shows a specific structure which uses a coherence frequency of more than $N_{freq}$ equal to the frequency-axis arrangement distance of the reference signal and a coherence time of more than $N_{time}$ equal to the time-axis arrangement distance of the reference signal. This lattice-format structure of FIG. 5C can minimize the number of reference signals, and performs the interpolation in time and frequency areas.

The above-mentioned lattice-format structure can reduce the number of reference signal whereas it is very sensitive to the interpolation method and the channel selective characteristics, so that it is preferred by the OFDMA scheme. Also, the lattice-format structure can easily change the arrangement method of the reference signal according to channel environments.

FIG. 6A shows an OFDM frame structure including a high-density reference signal. FIG. 6B shows another OFDM frame structure including a low-density reference signal.

In the case of transmitting the lattice-format reference signal, the low-density reference signal is transmitted to a destination as shown in FIG. 6A.

If an objective channel has strong frequency-selective characteristics and strong time-selective characteristics, the high-density reference signal can be transmitted to a destination as shown in FIG. 6B.

In the case of transmitting a plurality of reference signals as shown in FIG. 6B, the reference signals are closely arranged on a frequency axis under the channel having the high frequency-selective characteristic, and are also closely arranged on a time axis under the same channel, so that it is very resistant to the time-selective characteristic.

The reference-signal transmission structure of FIG. 6B reduces the time-axis arrangement distance and the frequency-axis arrangement distance of the reference signal by half as compared to the structure of FIG. 6A, so that it can also be used for another channel having the ½ coherence time $N_{time}$ and the ½ coherence frequency $N_{freq}$. However, it should be noted that the amount of Tx data is reduced by the number of added reference signals.

The conventional OFDMA-based wireless communication system equally applies a reference signal having a predetermined pattern to all the frames, and transmits the reference signal, resulting in the implementation of channel estimation.

However, multiple users (i.e., a multi-user) have different channel environments, so that a fixed reference signal structure is unable to satisfy the request of the multi-user.

In the case of transmitting the high-density reference signal to increase the channel estimation performance as shown in FIG. 6B, an objective performance of a user who requests a high channel-estimation performance. However, it should be noted that some users may have wasted pilots.

In the case of transmitting the low-density reference signal to improve the system production yield as shown in FIG. 6A, there are many sub-channels, but an unexpected user having an increasing bit error may occur.

For example, a rapidly-moving user (i.e., a user having a high moving speed) experiences an abruptly-changing channel, and has a short coherence time. So, in order to acquire the channel estimation performance, the reference signal structure in which several reference signals are closely arranged is adequate for the above-mentioned rapidly-moving user.

However, some users may be in a halt status. If the user is in the halt status, the coherence time is long, so that he or she may acquire a superior channel estimation performance although the interval among the reference signals is long.

Therefore, the above-mentioned conventional wireless communication system for transmitting the reference signal using a single-pattern structure cannot satisfy a variety of user requests. In conclusion, a method for transmitting the reference signal having an appropriate reference-signal density in consideration of the reference-signal density and the channel estimation performance must be considered.

DISCLOSURE

Technical Problem

Accordingly, the present invention is directed to a method and apparatus for transmitting a reference signal to adjust a reference-signal density according to conditions of a user's channel estimation request, a method and apparatus for setting a reference-signal transmission pattern, and a method and apparatus for setting/allocating the resource block, that substantially obviate one or more problems due to limitations and disadvantages of the related art.

An object of the present invention is to provide a method for establishing a reference-signal transmission pattern to implement different reference-signal densities. according to user's situations, a method for establishing the resource block, and a method for transmitting a reference signal based on the resource block, so that an OFDM transmission system having multiple users (i.e., a multi-user) can effectively perform the channel estimation.

Another object of the present invention is to provide an apparatus for transmitting a reference signal, an apparatus for establishing the resource block, and an apparatus for allocating the resource block, so that it can be used as a transmission end for transmitting the reference signal having a variable density.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

To achieve these objects and other advantages and in accordance with the purpose of the invention, as embodied and broadly described herein, a method for transmitting a reference signal comprising: arranging at least one mandatory reference signal in a total time-frequency resource area according to a first pattern, thereby defining a first-type block; defining a second-type block having a reference-signal density higher than that of the first-type blocks, and allocating the first-type block to a first user who requests a first channel estimation performance less than a threshold value, allocating the second-type block to a second user who requests a second channel estimation performance equal to or higher than the threshold value, and transmitting the reference signals.

Preferably, the second-type block defined bu arranging the mandatory reference signal in the time-frequency resource area according to the first pattern, and arranging at least one additional reference signal according to a second pattern.

Preferably, the first pattern is indicative of a lattice-type reference-signal arrangement pattern; and the second pattern is indicative of a specific pattern arranging the additional reference signal at a specific location at which a time-axis interval and a frequency-axis interval of the mandatory reference signal, which has been arranged according to the first pattern, are compensated.

Preferably, the threshold value is decided by not only a requested channel estimation performance but also an amount of data to be transmitted.

Preferably, the user who requests the channel estimation performance equal to or higher than the threshold value includes at least one of a high-rate user having data rate higher than a predetermined data rate, a user for transmitting channels status information, a user who uses a MIMO scheme, and a user who uses a channel having a channel-selective characteristic higher than a predetermined threshold value.

Preferably, location information of the first-type block and the second-type block is acquired from additional control information indicating the location for each user.

Preferably, the method further comprises: in association. with location information of the first-type block and location information of the second-type block for each user, a location of the second-type block is determined as a first location at which resource allocation is conducted by a distributed resource allocation scheme in a resource area for each user; and a location of the first-type block is determined as a second location at which resource allocation is conducted by a localized resource allocation scheme in the resource area for each user.

In another aspect of the present invention, there is provided a method for establishing a transmission pattern of a reference signal comprising: arranging a mandatory reference signal in a total time-frequency resource area according to a first pattern; and arranging an additional reference signal in a time-frequency resource area for a user, who requests a channel estimation performance equal to or higher than a threshold value, according to a second pattern.

In yet another aspect of the present invention, there is provided a method for transmitting a. reference signal comprising: arranging a mandatory reference signal to be transmitted via each of a plurality of antennas in a total time-frequency resource area according to a first pattern; arranging an additional reference signal to be transmitted via each of the plurality of antennas in a time-frequency resource area for a user, who requests a channel estimation performance equal to or higher than a threshold value, according to a second pattern; and transmitting the mandatory reference signal and the additional reference signal via the several antennas.

Preferably, the mandatory reference signal and the additional reference signal transmitted via the plurality of antennas are multiplexed according to any one of a frequency division multiplexing (FDM) scheme, a time division multiplexing (TDM) scheme, and a code division multiplexing (CDM) scheme.

Preferably, the multiplexing schemes of the mandatory reference signal and the additional reference signal are independent from each other.

In yet another aspect of the present invention, there is provided a method for establishing a resource block comprising: arranging at least one mandatory reference signal in a total time-frequency resource area according to a first pattern, thereby establishing a first-type block; and arranging the mandatory reference signal in the total time-frequency resource area according to the first pattern, and arranging at least one additional reference signal according to a second pattern, thereby establishing a second-type block.

In yet another aspect of the present invention, there is provided an apparatus for transmitting a reference signal comprising: a sub-carrier mapping module for mapping a plurality of parallel data streams and reference signals to a corresponding sub-carrier according to a predetermined mapping pattern, and allocating the mapping result; and a signal conversion module for mapping an output signal of the sub-carrier mapping module to a time-area signal, and performing signal conversion, in which the reference signal includes a mandatory reference signal and an additional reference signal, and the sub-carrier mapping module arranges the mandatory reference signal in a total time-frequency resource area according to a first pattern, arranges the additional reference signal in a time-frequency resource area for a user, who requests a channel estimation performance equal to or higher than a threshold value, according to a second pattern.

In yet another aspect of the present invention, there is provided an apparatus for establishing a resource block comprising: a first-type block setup module for establishing a first-type block in which a mandatory reference signal is arranged in a total time-frequency resource area according to a first pattern; and a second-type block setup module for establishing a second-type block, in which the mandatory reference signal is arranged in the total time-frequency resource area according to the first pattern and an one additional reference signal is arranged in the time-frequency resource area according to a second pattern.

In yet another aspect of the present invention, there is provided an apparatus for allocating a reference block comprising: a first-type block setup module for establishing a first-type block in which a mandatory reference signal is arranged in a total time-frequency resource area according to a first pattern; a second-type block setup module for establishing a second-type block, in which the mandatory reference signal is arranged in the total time-frequency resource area according to the first pattern and an additional reference signal is arranged in the time-frequency resource area according to a second pattern; and a resource-block allocation module for allocating the first-type block to a first user who requests a first channel estimation performance less than a threshold value, and allocating the second-type block to a second user who requests a second channel estimation performance equal to or higher than the threshold value.

In yet another aspect of the present invention, there is provided an apparatus for establishing a reference block comprising: a first-type block setup module for establishing a first-type block in which a first reference signal is arranged in a total time-frequency resource area according to a first pattern; and a second-type block setup module for establishing a second-type block, in which a second reference signal is arranged in the total time-frequency resource area according to a second pattern, in which the first pattern has a reference-signal density higher than that of the second pattern.

In yet another aspect of the present invention, there is provided an apparatus for allocating a resource block comprising: a first-type block setup module for establishing a first-type block in which a first reference signal is arranged in a total time-frequency resource area according to a first pattern; a second-type block setup module for establishing a second-type block, in which a second reference signal is arranged in the total time-frequency resource area according to a second pattern; and a resource-block allocation module for allocating the first-type block to a first user who requests a first channel estimation performance less than a threshold value, and allocating the second-type block to a second user who requests a second channel estimation performance higher than the threshold value, in which the first pattern has a reference-signal density higher than that of the second pattern.

It is to be understood that both the foregoing general description and the following detailed description of the present invention are exemplary and explanatory and are intended to provide further explanation of the invention as claimed.

ADVANTAGEOUS EFFECTS

The present invention relates to the method for transmitting the reference signal, the method for establishing a transmission pattern of the reference signal, and a method and apparatus for establishing/allocating the resource block. In order to effectively the channel estimation during the OFDM transmission having multiple users, the present invention can establish the reference signal transmission pattern so as to allocate different reference-signal densities to individual users according to the user's situations.

Therefore, the present invention can prevent resources from being unnecessarily wasted, and can increase the channel estimation performance according to the user's situation, resulting in an increased production yield of a system.

DESCRIPTION OF DRAWINGS

The accompanying drawings, which are included to provide a further understanding of the invention, illustrate embodiments of the invention and together with the description serve to explain the principle of the invention.

In the drawings:

FIGS. 10A~10B exemplarily show the method for variably adjusting the reference-signal density for a multi-antenna I/O (Input/Output) scheme using a frequency division multiplexing (FDM) method according to the present invention;

FIGS. 11A~11B exemplarily show the method for variably adjusting the reference-signal density for a multi-antenna I/O (Input/Output) scheme using a time division multiplexing (TDM) method according to the present invention;

FIGS. 12A~12B exemplarily show the method for variably adjusting the reference-signal density for a multi-antenna I/O (Input/Output) scheme using a code division multiplexing (CDM) method according to the present invention;

BEST MODE

Reference will now be made in detail to the preferred embodiments of the present invention, examples of which are illustrated in the accompanying drawings. Wherever possible, the same reference numbers will be used throughout the drawings to refer to the same or like parts.

For the convenience of description and better understanding of the present invention, the following detailed description will disclose a variety of embodiments and modifications of the present invention. In some cases, in order to prevent ambiguous concepts of the present invention from occurring, conventional devices or apparatuses well known to those skilled in the art will be omitted and denoted in the form of a block diagram on the basis of the important functions of the present invention. Wherever possible, the same reference numbers will be used throughout the drawings to refer to the same or like parts.

Prior to describing the present invention, it should be noted that most terms disclosed in the present invention correspond to general terms well known in the art, but some terms have been selected by the applicant as necessary and will hereinafter be disclosed in the following description of the present invention. Therefore, it is preferable that the terms defined by the applicant be understood on the basis of their meanings in the present invention.

One embodiment of the present invention provides a method for establishing a reference-signal transmission pattern so as to allocate variable reference-signal densities to individual users, a method for establishing the block, and a method for transmitting the reference signal using the aforementioned block establishment method.

According to one embodiment of this invention, a variety of resource blocks allocated to users have different reference-signal densities, so that the optimum resource block is allocated to each user according to the user's situation. For example, if a user requests the fine channel estimation performance or the high channel-selective characteristic, the resource block having a high reference-signal density is allocated to the user.

Otherwise, if a user does not request the fine channel estimation performance or the high channel-selective characteristic, the resource block having a relatively low reference-signal density is allocated to the user.

Figure 7A:
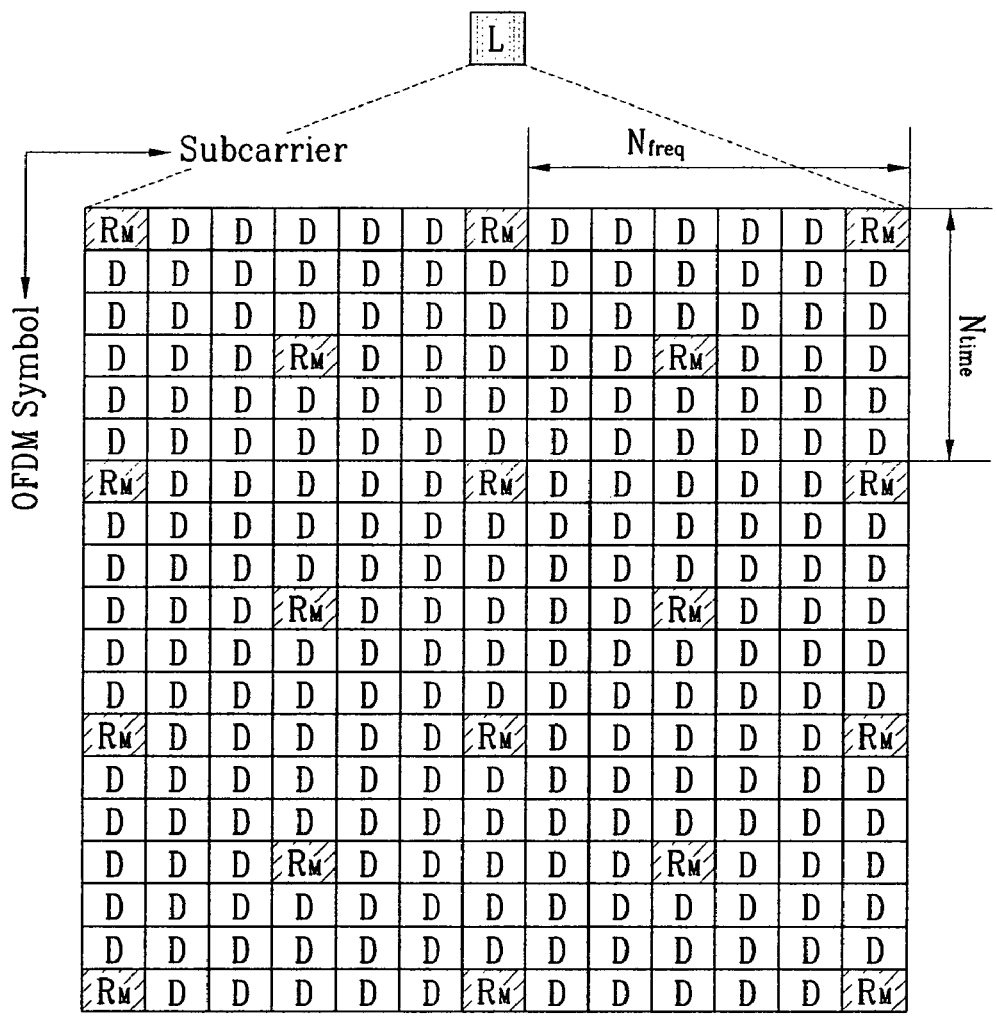
FIGS. 7A~7B exemplarily show arrangement methods for allocating different reference-signal densities to users according to user requests according to the present invention.
Figure 7B:
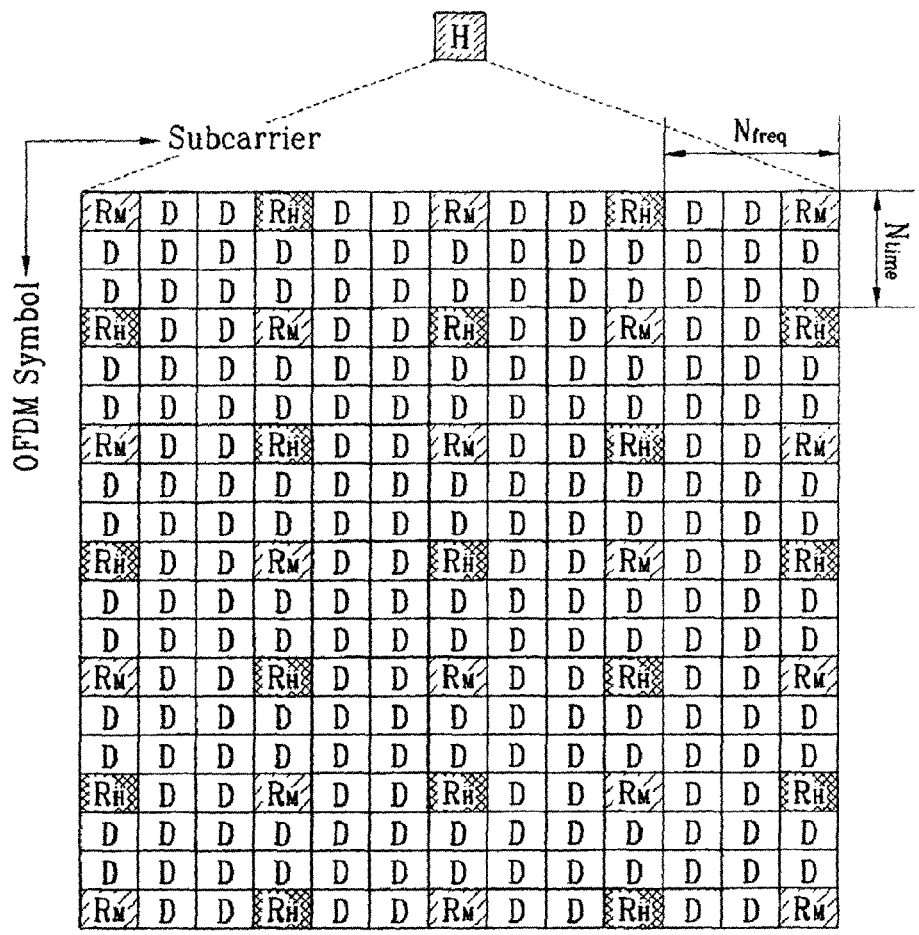

FIGS. 7A~7B exemplarily show arrangement methods for allocating different reference-signal densities to users according to user requests according to the present invention.

Referring to FIG. 7A, the low-density resource block having a low reference-signal density arranges the reference signal ($R_M$) according to a predetermined pattern (hereinafter referred to as a first pattern) in a total time-frequency resource area (e.g., the lattice-type pattern profitable to the adjustment of the reference-signal density).

Referring to FIG. 7B, the high-density resource block having a high reference-signal density further includes an additional reference signal ($R_H$) for raising the reference signal density according to the second pattern in the time-frequency resource area including the reference signal ($R_M$) based on the first pattern. For example, the second pattern is another lattice pattern different from the first pattern, so that the reference signals ($R_H$) are arranged at positions compensating for the frequency-axis interval and the time-axis interval among the reference signals ($R_M$) according to the second pattern.

The resource block of FIG. 7A configures the low-density block, and the other resource block of FIG. 7B configures the high-density block. Compared with the low-density block of FIG. 7A, the high-density block of FIG. 7B has the ½ $N_{time}$ indicating the time-axis arrangement distance and the ½ $N_{freq}$ indicating the frequency-axis arrangement distance.

For the convenience of description, each of the high-density and low-density blocks includes a resource block on a frequency axis, and includes a frame on a time axis. In this case, the resource block uses a predetermined number of sub-carriers as a unit, and the frame uses a predetermined number of OFDM symbols as a unit.

However, it should be noted that the high-density and low-density blocks need not have both the frame unit on the time axis and the resource-block unit on the frequency axis, and they can be established in different ways according to resource allocation units of the system capable of allocating the resources to the user.

In the meantime, the high-density block is allocated to a first user who requests a high channel estimation performance, and the low-density block is allocated to a second user who has a larger amount of Tx data as compared to the high channel estimation performance, so that the reference signal transmission is conducted. A detailed description thereof will be described with reference to FIG. 8.

As shown in FIGS. 7A and 7B, two reference signals $R_m$ and $R_H$ are arranged in a transmission block together with the data (D). The reference signals $R_M$ are arranged according to the first pattern, and the reference signals $R_H$ for forming the high-density block are additionally arranged according to the second pattern. For the convenience of description and better understanding of the present invention, in FIGS. 7A and 7B, the reference signal ($R_M$) is denoted by a "mandatory reference symbol", and the other reference signal ($R_H$) is denoted by a "reference symbol for high quality channel estimation" or just by "additional reference symbol".

Figure 8:
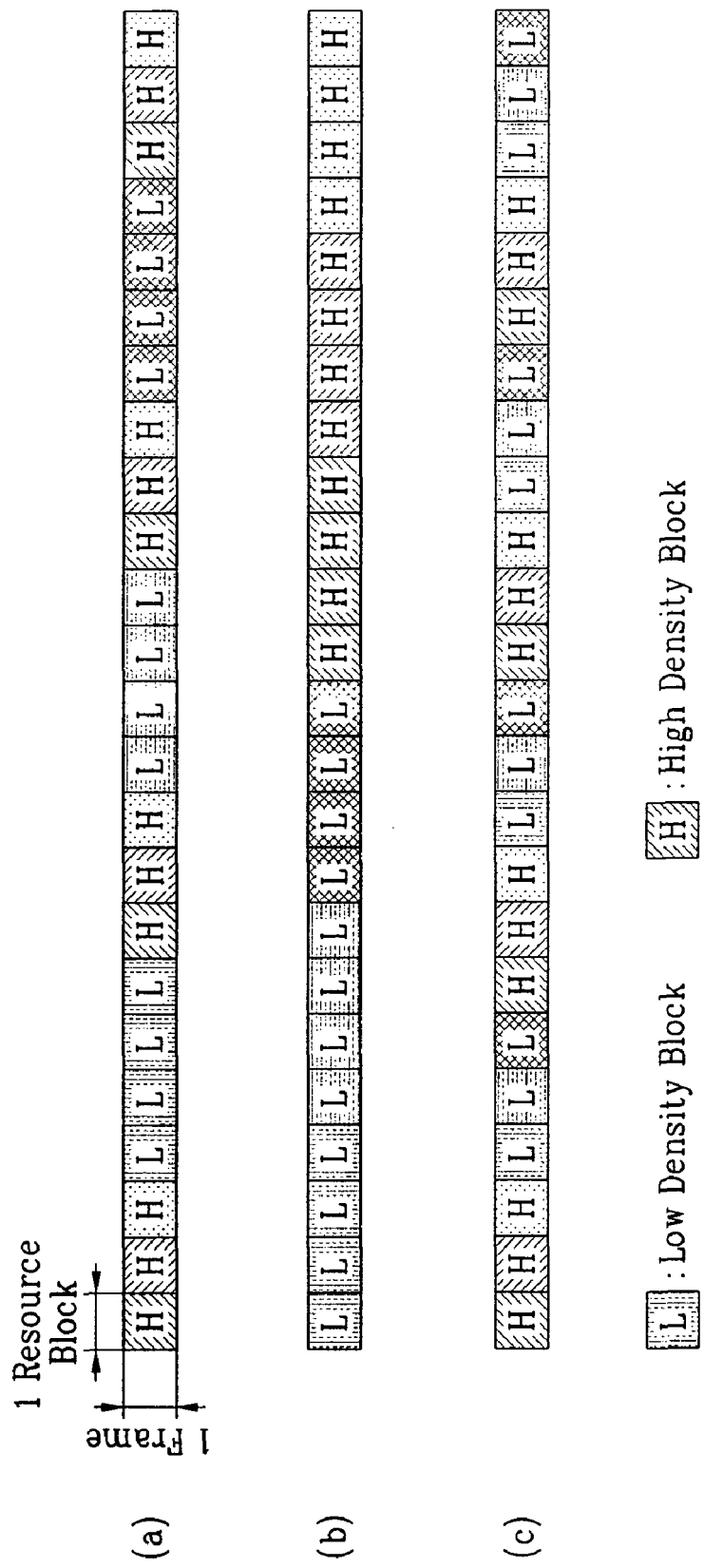
FIG. 8 is a conceptual diagram illustrating a method for allocating unit-resource blocks shown in FIGS. 7A and 7B to individual users, and transmitting the reference signal to the users according to the present invention.

FIG. 8 is a conceptual diagram illustrating a method for allocating unit-resource blocks shown in FIGS. 7A and 7B to individual users, and transmitting the reference signal to the users according to the present invention.

According to this embodiment of FIG. 8, the high-density block (H) of FIG. 7B is allocated to a user (i.e., a high-rate user) who request the high channel estimation performance. The low-density block (L) of FIG. 7A is allocated to another user (i.e., a low-rate user) who requests the relatively-low channel estimation performance, so that it can increase a data transmission area. The blocks having the same background pattern indicate the resource blocks allocated to the same user.

There are three kinds of resource allocation schemes, i.e., the localized resource allocation scheme, the distributed resource allocation scheme, and the resource allocation scheme based on the resource block level.

FIGS. 8(a) to (c) show that each of the high-density block and the low-density block is used as an allocation unit. Specifically, FIG. 8(a) shows that resources are allocated to several users according to the resource allocation scheme based on the resource block level, FIG. 8(b) shows that resources are allocated to several users according to the localized resource allocation scheme, and FIG. 8(c) shows that resources are allocated to several users according to the distributed resource allocation scheme.

Generally, the low-rate user acquires the scheduling gain according to the localized resource allocation scheme, and the high-rate user acquires a diversity gain according to the distributed resource allocation scheme. Therefore, in the case of FIG. 8(a) in which the combination of the localized resource allocation scheme and the distributed resource allocation scheme is used as the resource allocation scheme based on the resource block level, the transmission band is generally allocated to the high-rate user according to the distributed resource allocation scheme, or is generally allocated to the low-rate user according to the localized resource allocation scheme.

However, it should be noted that the resources may also be allocated according to only one of the localized resource allocation scheme and the distributed resource allocation scheme, irrespective of the moving speed, as can be seen from FIGS. 8(b) and 8(c). Therefore, the following combination of the localized resource allocation scheme and the distributed resource allocation scheme can be proposed according to the present invention.

It is most preferable that the high-rate user uses the high-density block and resources are allocated to the high-rate user according to the distributed resource allocation scheme. However, due to the system setup complexity, the resources may also be allocated to the high-rate user who uses the high-density block according to the localized resource allocation scheme, if required.

It is most preferable that the low-rate user uses the low-density block and resources are allocated to the low-rate user according to the localized resource allocation scheme. However, due to the above-mentioned system setup complexity, the resources may also be allocated to the low-rate user who uses the low-density block according to the distributed resource allocation scheme, if required.

It is well known to those skilled in the art that some resource blocks of FIG. 8, each of which includes the reference signal and the data signal, are grouped according to the user's request, so that the grouped resource block can be allocated to the user.

In the meantime, the present invention determines whether each user requests a high channel estimation performance on the basis of a predetermined threshold level associated with the requested channel estimation performance. Namely, the present invention determines whether the requested channel estimation performance is higher or lower than the above-mentioned threshold value.

There are a variety of cases, each of which requires the high channel estimation performance, for example, a first case in which the high-rate user requires the high channel estimation performance, a second case in which channel status information is transmitted, a third case in which a multiple I/O scheme is established, and a fourth case in which the high channel-selective characteristic is established. In this case, the above-mentioned fourth case occurs by the rapid moving speed and the long multi-path time delay.

The above-mentioned threshold value associated with the requested channel estimation performance can be decided in consideration of at least one of the above-mentioned cases.

According to another embodiment of the present invention, the present invention can decide the threshold value in consideration of not only the requested degree of the channel estimation performance but also the amount of Tx data for each user, if required.

According to the above-mentioned description, the high-density block is allocated to the high-rate user, and the low-density block is allocated to the low-rate user, so that the reference signal can be effectively transmitted to a destination.

In the meantime, the location information of the high-density and low-density blocks can be acquired by additional control information, or can also be acquired by conventional frame information.

For example, provided that the resources are allocated to the high-rate user according to the distributed resource allocation scheme, and are allocated to the low-rate user according to the localized resource allocation scheme, a specific position, at which the resource block has been distributively allocated, may be considered to be a specific block having a high estimation signal density.

Figure 9:
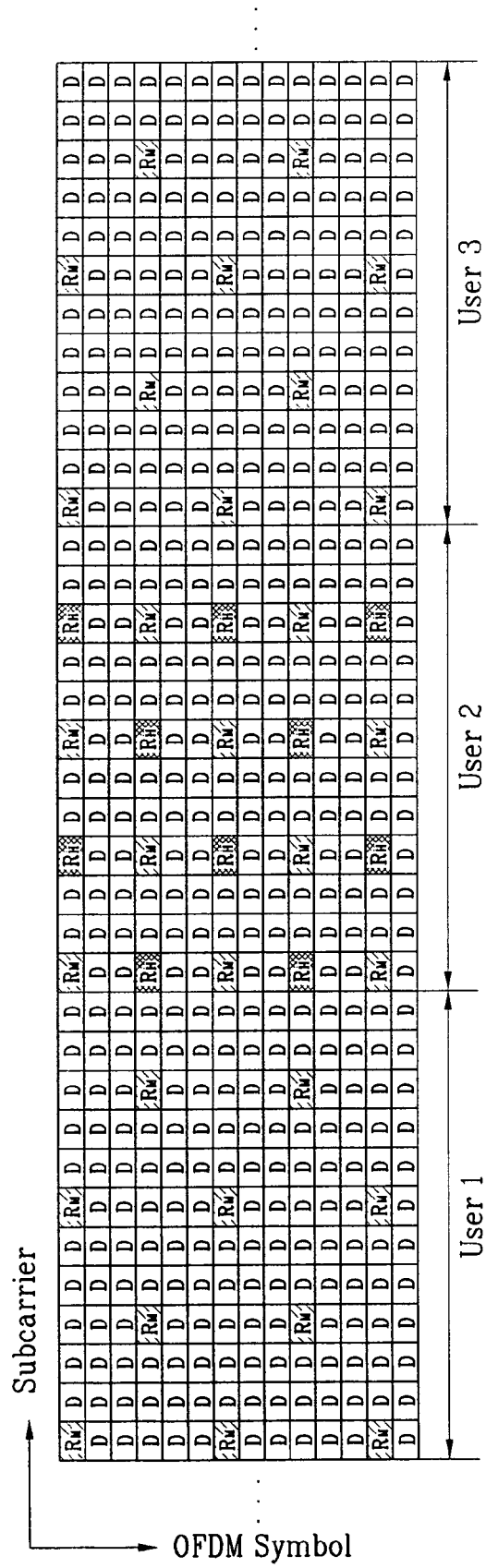
FIG. 9 is a conceptual diagram illustrating methods shown in FIGS. 7A~8 according to the present invention.

FIG. 9 is a conceptual diagram illustrating methods shown in FIGS. 7A~8 according to the present invention.

FIG. 9 shows a block allocation example in which the block having a high reference-signal density is allocated to a specific band according to the requested channel estimation performance.

The OFDM transmission system allocates a predetermined frequency band to a multi-user, multiplexes the Tx signal of the multi-user, and transmits the multiplexed signal via a single OFDM symbol.

As can be seen from FIG. 9, an allocation unit of a data transmission band is allocated to the users using the high-density and low-density blocks as a unit.

In more detail, first and third blocks of FIG. 9 are used as the low-density blocks for the low-rate user, so that the first block is allocated to a first user (User 1) and the third block is allocated to a third user (User 3). A second block of FIG. 9 is used as the high-density block for the high-rate user, so that it is allocated to a second user (User 2).

In this way, the reference-signal density is adjusted according to the user's speed (i.e., the user's rate), so that the high-rate user can acquire the high channel estimation performance.

Differently from the above-mentioned example, one embodiment of the present invention provides a method and apparatus for arranging the mandatory reference symbols in a total time-frequency resource area according to a predetermined lattice pattern, and arranging the reference symbol (hereinafter referred to as an additional reference signal) for the high quality channel estimation in a time-frequency area of the high-rate user in order to increase the reference-signal density. In this case, the resource allocation for the user may not be indispensably based on a predetermined block unit. The additional reference signal is arranged in the band allocated to the high-rate user, so that the reference-signal density increases.

In the meantime, the method for establishing/transmitting the reference signal to implement a variable reference signal density may also be extended to the multi-antenna I/O transmission scheme (i.e., the MIMO scheme).

FIGS. 10A~10B exemplarily show the method for variably adjusting the reference-signal density for a multi-antenna I/O (Input/Output) scheme using a frequency division multiplexing (FDM) method according to the present invention.

Referring to FIGS. 10A and 10B, in the case of a user (i.e., the low-rate user) who requests a relatively-low channel estimation performance, the mandatory reference signals ($R_{M1}$ and $R_{M2}$) to be transmitted via each of antennas (e.g., the antenna 1 and the antenna 2) are arranged in the total time-frequency resource area according to a predetermined pattern such as a lattice pattern, and are then transmitted. In this case, the reference signals ($R_{M1}$ and $R_{M2}$) to be transmitted via each antenna are divided and allocated to the frequency axis, so that the present invention can acquire the multi-antenna diversity gain on the frequency axis.

In the meantime, in the case of a user (i.e., the high-rate user) who requests the high channel estimation performance, not only the mandatory reference signals ($R_{M1}$ and $R_{M2}$), but also the additional reference signals ($R_{H1}$ and $R_{H2}$) to be transmitted via each of the antennas 1 and 2 are arranged in a corresponding time-frequency resource area according to another pattern, as shown in FIG. 10B, and are then transmitted to a destination. As a result, the present invention reduces an arrangement interval of the reference signals, which are transmitted to a corresponding user via the individual antennas on either the time axis or the frequency axis, resulting in the implementation of high channel estimation performance.

In the meantime, as can be seen from FIGS. 10A and 10B, the mandatory reference signals ($R_{M1}$ and $R_{M2}$) and the additional reference signals ($R_{H1}$ and $R_{H2}$) transmitted via the individual antennas are FDM-arranged to implement the MIMO transmission scheme.

In more detail, referring to FIGS. 10A and 10B, the mandatory reference signal ($R_{M1}$) and the additional reference signal ($R_{H1}$) transmitted via the antenna 1 are allocated to be adjacent to the mandatory reference signal ($R_{M2}$) and the additional reference signal ($R_{H2}$) transmitted via the antenna 2. However, if the reference signals transmitted via the individual antennas are divided in the frequency area and are allocated to different frequency locations, detailed location information of the reference signals may not be limited to the above-mentioned exemplary locations, and can also be applied to other locations.

The multiplexing scheme of the mandatory reference signals ($R_{M1}$ and $R_{M2}$) and the additional reference signals ($R_{H1}$ and $R_{H2}$) may not be limited to the FDM scheme, and can also be applied to the following TDM and CDM schemes as necessary.

FIGS. 11A~11B exemplarily show the method for variably adjusting the reference-signal density for a multi-antenna I/O (Input/Output) scheme using a time division multiplexing (TDM) method according to the present invention.

Referring to FIGS. 11A and 11B, in the same manner as in the FDM-based multi-antenna scheme, the present invention transmits the low-density reference signal to the low-rate user who requests a relatively-low channel estimation performance, as shown in FIG. 11A. And, the present invention transmits the high-density reference signal to the high-rate user who requests the high channel estimation performance, as shown in FIG. 11B.

The mandatory reference signals ($R_{M1}$ and $R_{M2}$) and the additional reference signals ($R_{H1}$ and $R_{H2}$) transmitted via the individual antennas are divided on the time axis instead of the frequency axis, and are then transmitted, so that the present invention can acquire the time-axis multi-antenna diversity.

In more detail, although FIGS. 11A and 11B show that the mandatory reference signals ($R_{M1}$ and $R_{M2}$) and the additional reference signals ($R_{H1}$ and $R_{H2}$) are allocated to neighboring locations on the time axis, and are then transmitted to a destination. If the reference signals transmitted via the individual antennas are divided on the time axis, the scope of the reference signals may not be limited to the above-mentioned example, and can also be applied to other examples as necessary.

Figure 12A:
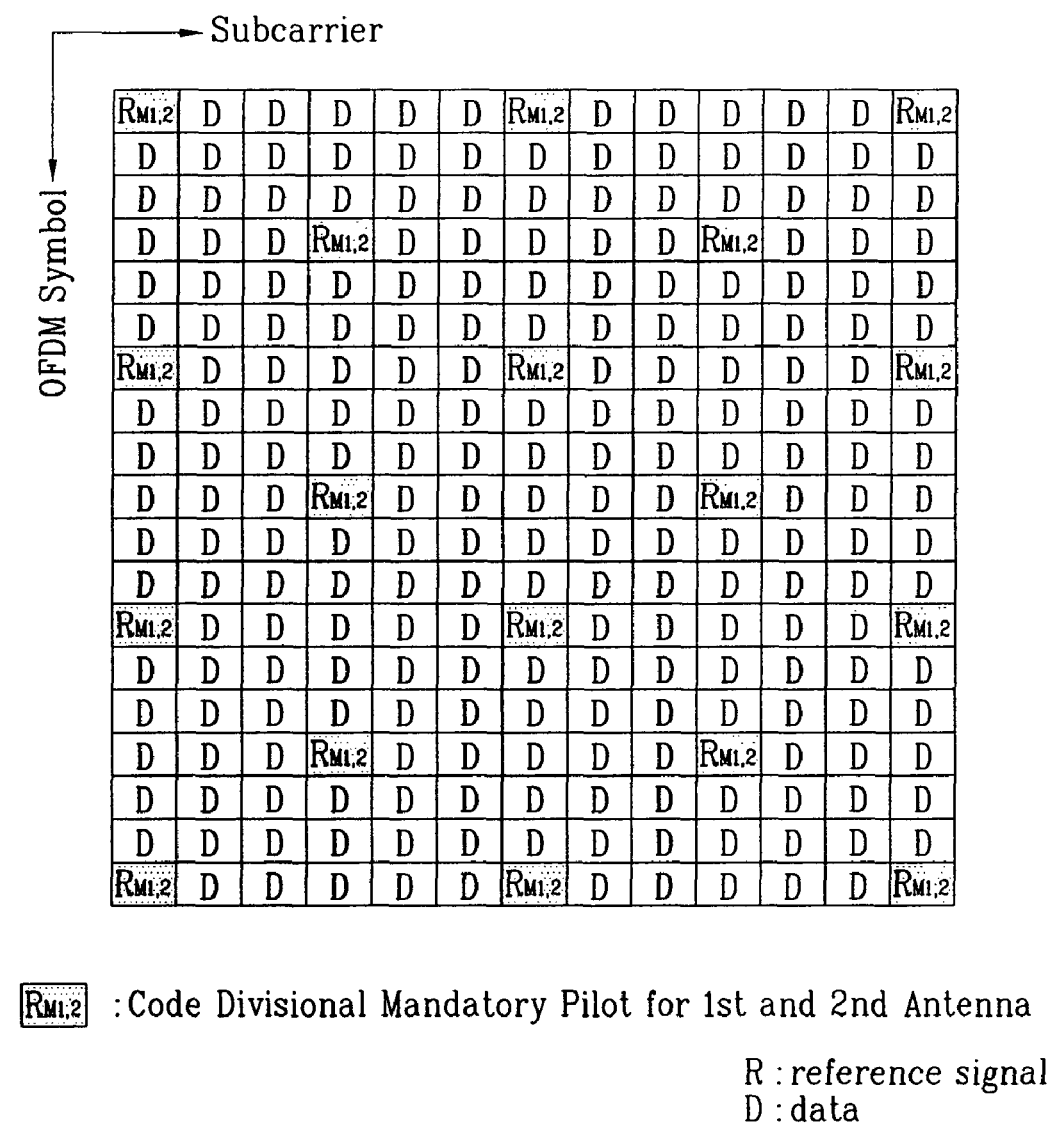

FIGS. 12A~12B exemplarily show the method for variably adjusting the reference-signal density for a multi-antenna I/O (Input/Output) scheme using a code division multiplexing (CDM) method according to the present invention.

Referring to FIGS. 12A and 12B, the present invention adjusts the density of the reference signals transmitted via several antennas, so that the reference signals are allocated to the low-rate user who requests the relatively-low channel estimation performance as shown in FIG. 12A, and are also allocated to the high-rate user who requests the high channel estimation performance as shown in FIG. 12B, so that all the request conditions of the users can be satisfied.

Also, FIGS. 12A and 12B show that the mandatory reference and the additional reference signals transmitted via the individual antennas are divided into several sections by different codes.

The mandatory reference signal ($R_{M1}$) of the first antenna 1 is multiplied by the mandatory reference signal ($R_{M2}$) of the second antenna 2 at the same location, and is divided and transmitted to a destination. In other words, different codes are multiplied by the mandatory reference. signals ($R_{M1}$ and $R_{M2}$), and the multiplied result is divided and transmitted to the destination. This operation is denoted by "$R_{M1,2}$" in FIGS. 12A and 12B.

In this way, "$R_{H1,2}$" in FIGS. 12A and 12B indicates. that different codes are multiplied by the additional reference signals of the first antenna 1 and the second antenna 2, and are then combined.

In this case, there is no need to specifically limit the scope of the codes multiplied by the reference signals of the antennas 1 and 2. However, in order to allow the reception end to easily discriminate among the reference signals of the individual antennas, it is preferable that codes having the high coherence characteristic, i.e., orthogonal codes, are used.

In association with FIGS. 9A to 12B, the additional reference signals can be applied to the individual antennas in different ways. Preferably, the present invention can increase the density of the reference signal for only a specific antenna desired by either the user or the Node-B.

The apparatus for performing the above-mentioned method according to another embodiment of the present invention will hereinafter be described in detail.

Figure 13:
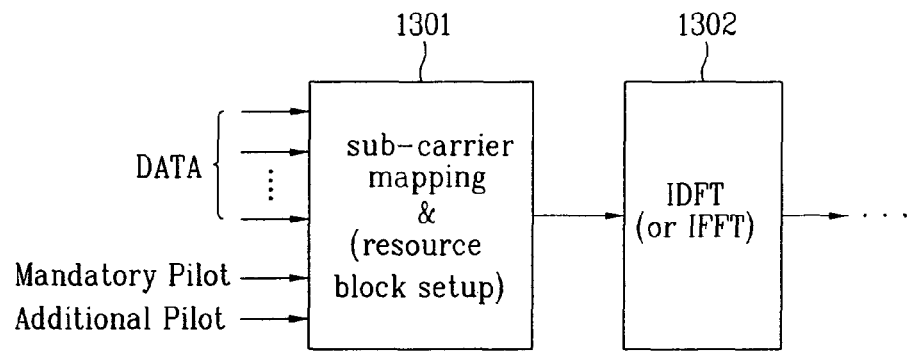
FIG. 13 is a block diagram illustrating a characteristic structure for variably adjusting the reference-signal density in a transmission end of a conventional OFDM communication system.

FIG. 13 is a block diagram illustrating a characteristic structure for variably adjusting the reference-signal. density in a transmission end of a conventional OFDM communication system.

Figure 1:
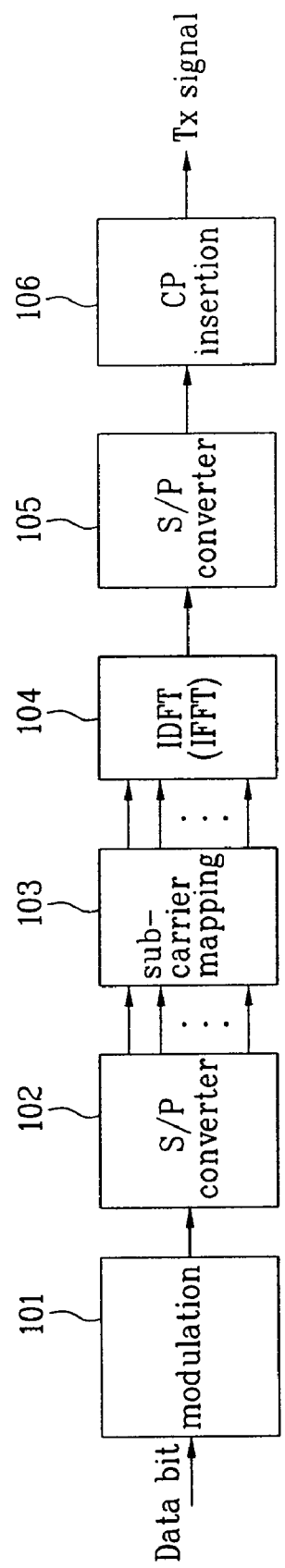
FIG. 1 is a block diagram illustrating a transmission end for use in a conventional OFDM communication system.
Figure 2:
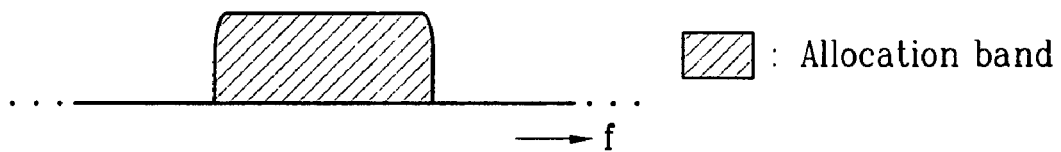
FIG. 2 is a conceptual diagram illustrating the localized resource allocation scheme.
Figure 3:
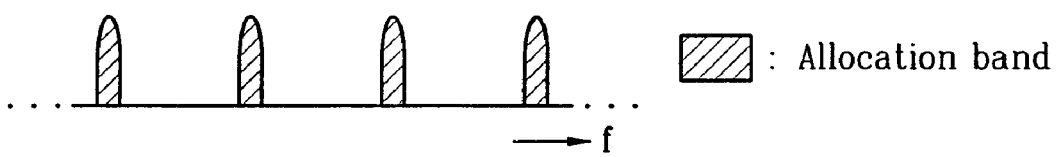
FIG. 3 is a conceptual diagram illustrating the distributed resource allocation scheme.
Figure 4:
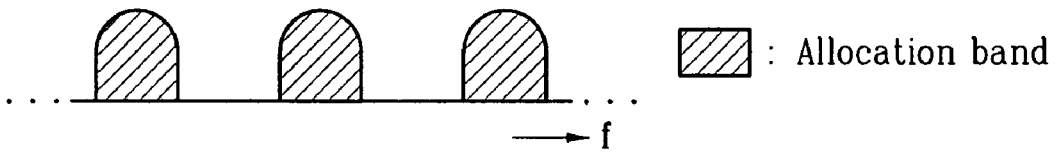
FIG. 4 is a conceptual diagram illustrating the resource allocation scheme based on the resource block level.
Figure 5A:
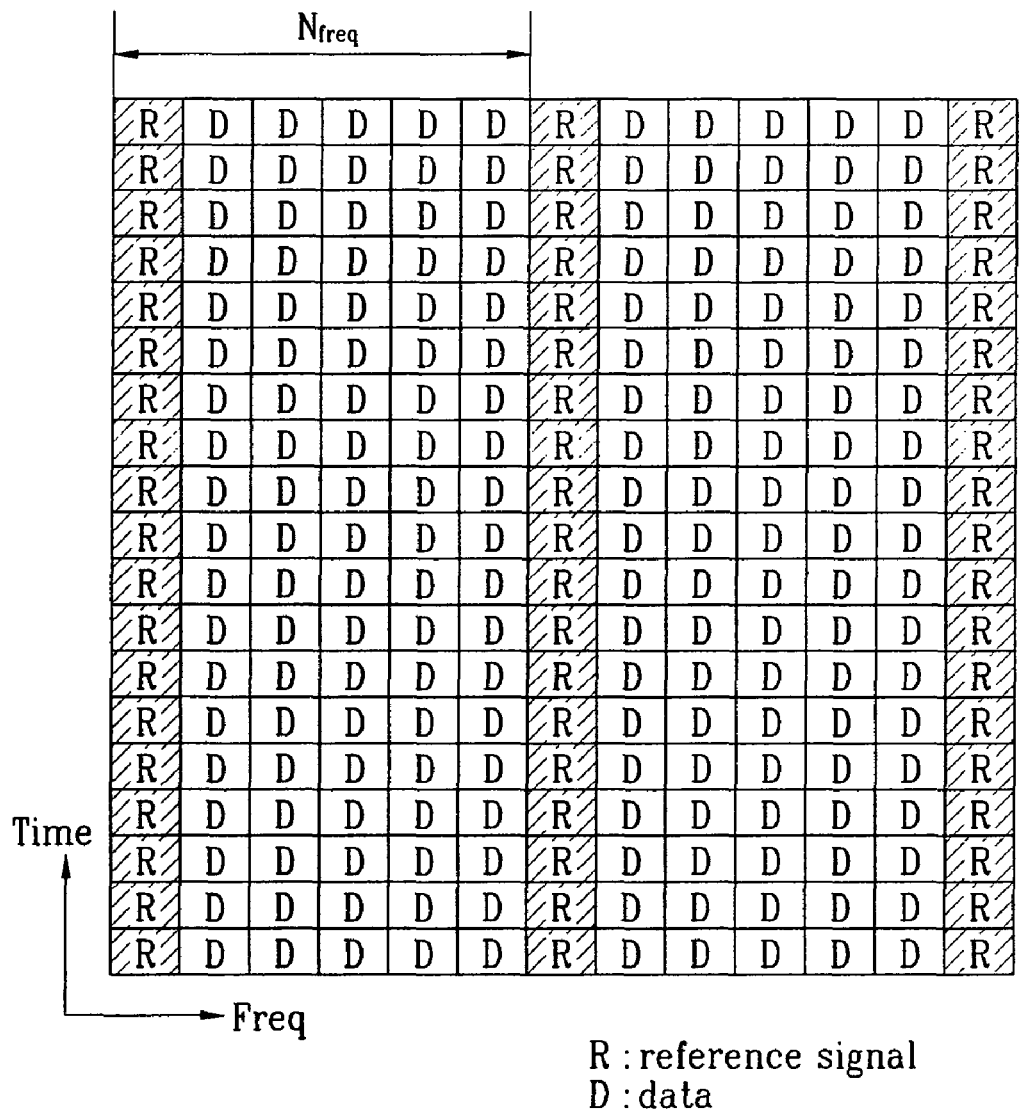
FIG. 5A shows the arrangement structure of the com-format reference signal for use in the OFDM system.
Figure 5B:
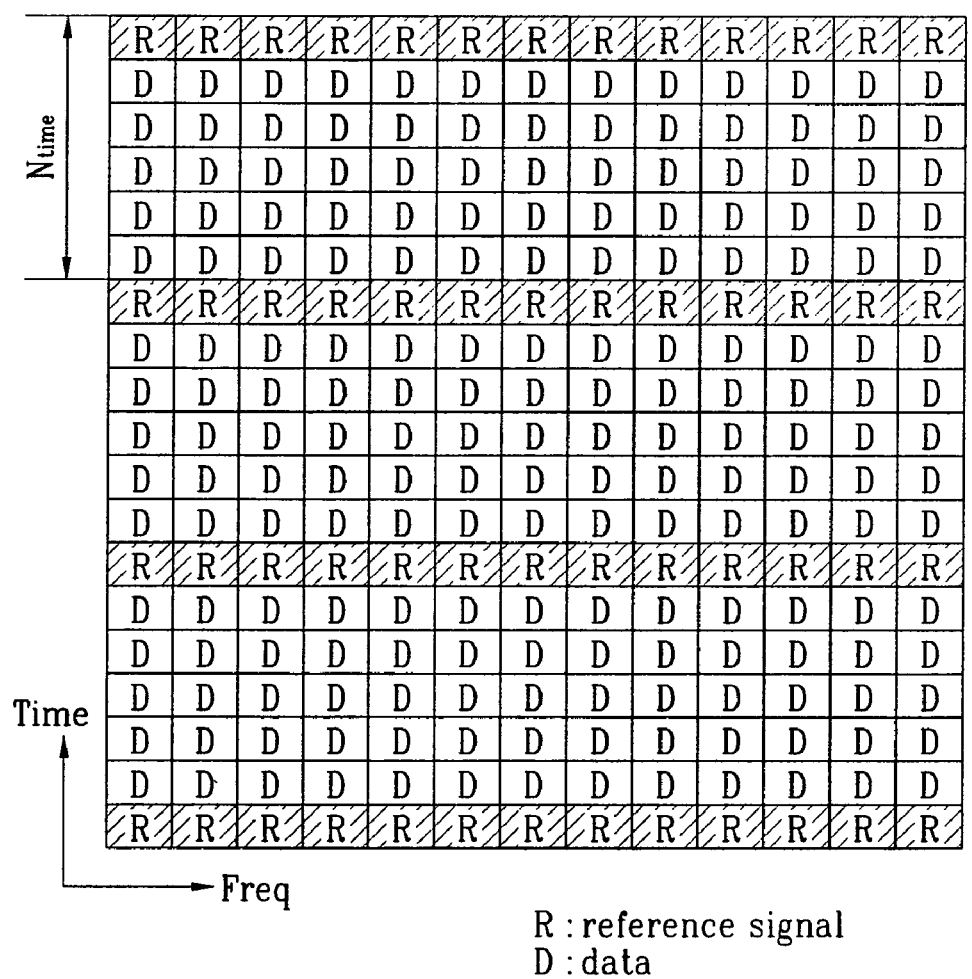
FIG. 5B shows the arrangement structure of the block-format reference signal for use in the OFDM system.
Figure 5C:
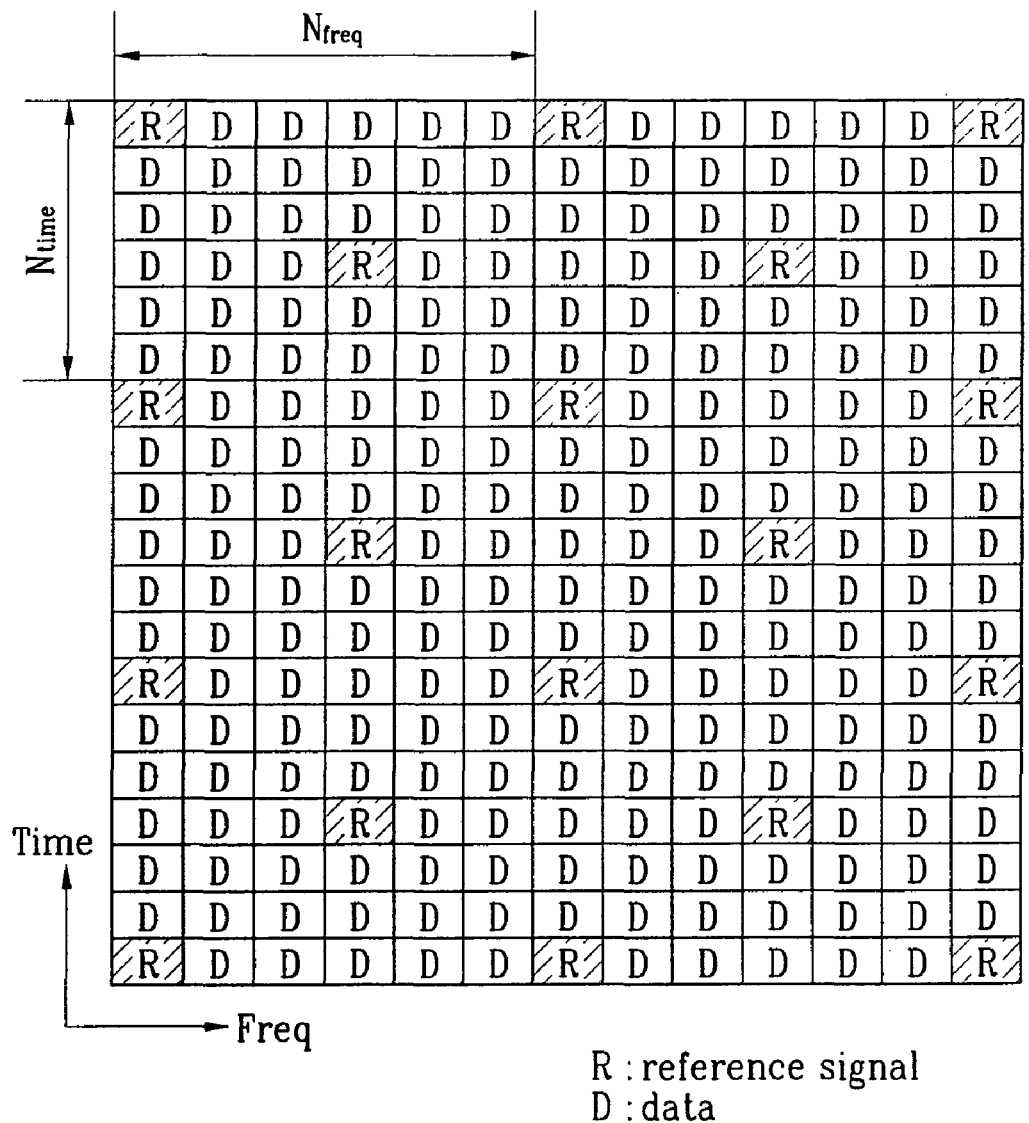
FIG. 5C shows the arrangement structure of the lattice-format reference signal for use in the OFDM system.
Figure 6A:
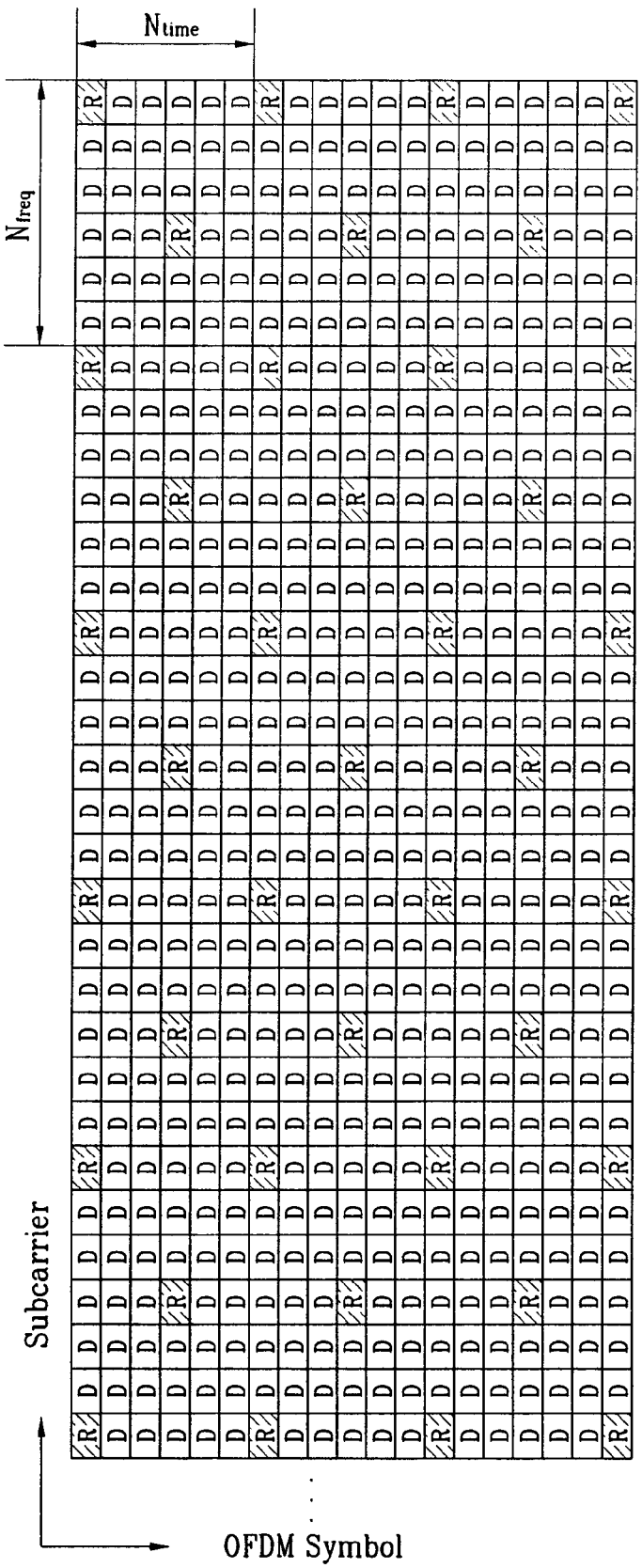
FIG. 6A shows an OFDM frame structure including a high-density reference signal.
Figure 6B:
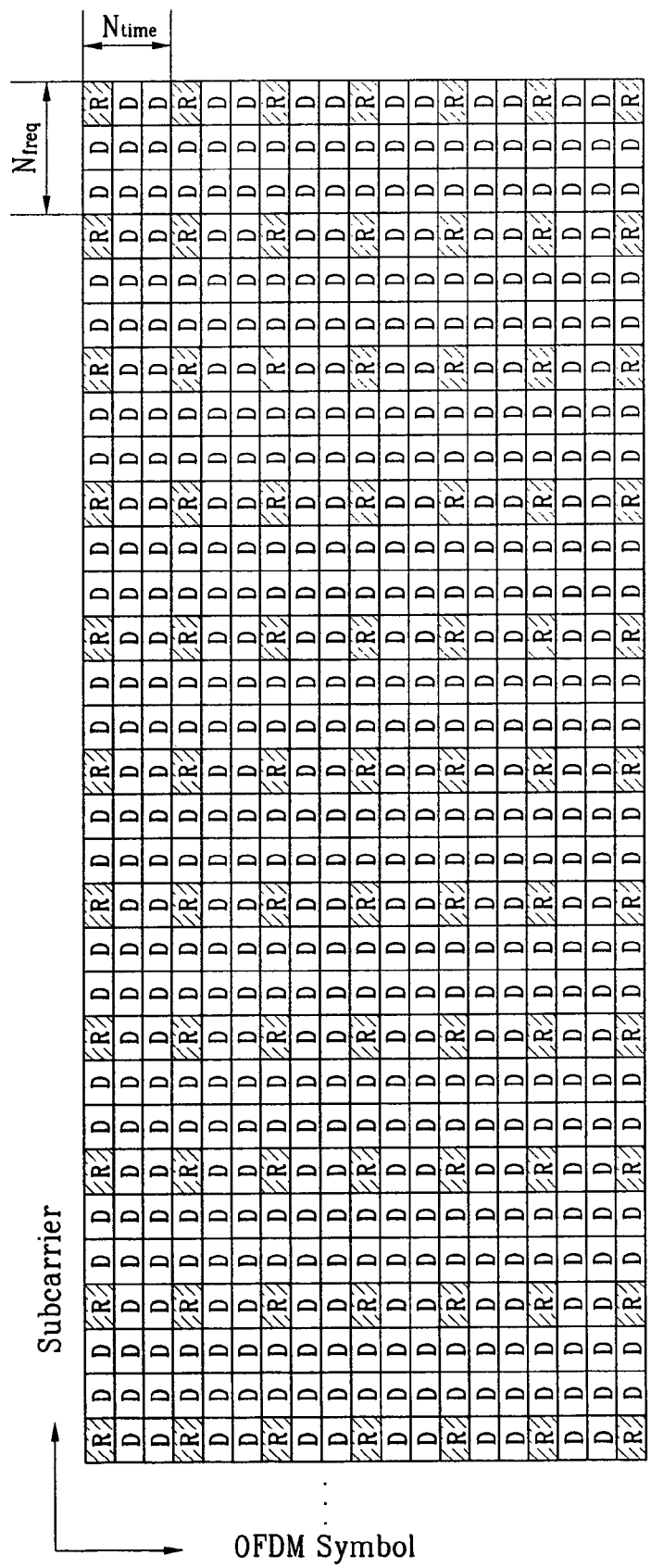
FIG. 6B shows another OFDM frame structure including a low-density reference signal.

In more detail, FIG. 13 shows only one part based on the sub-carrier mapping module 1301 which variably adjusts the reference-signal density in the general OFDM transmission end structure associated with FIG. 1.

The sub-carrier mapping module 1301 maps a plurality of parallel data streams (DATA) and reference signals to sub-carriers according to a predetermined mapping pattern, and allocates them to the sub-carriers.

The mandatory reference signal (i.e., the mandatory reference pilot signal) is arranged in the total time-frequency resource area according to the first pattern. If a user requests a channel estimation performance of more than the threshold value, the additional reference signal (i.e., the additional pilot) is arranged in the time-frequency resource area for the above-mentioned user according to the second pattern. Therefore, in the case of using the sub-carrier mapping module, the present invention allocates resources having different reference-signal densities to the users according to the requirements of the channel estimation performance of the individual users.

The output signal of the sub-carrier mapping module 1301 is applied to the IDFT module 1302, so that the IDFT module 1302 maps the received signal to the time-area signal and performs signal conversion. Thereafter, the output signal of the IDFT module 1302 is transmitted to the reception end via the P/S (parallel-to-serial) conversion module (not shown) and the CP insertion module (not shown).

Figure 14:
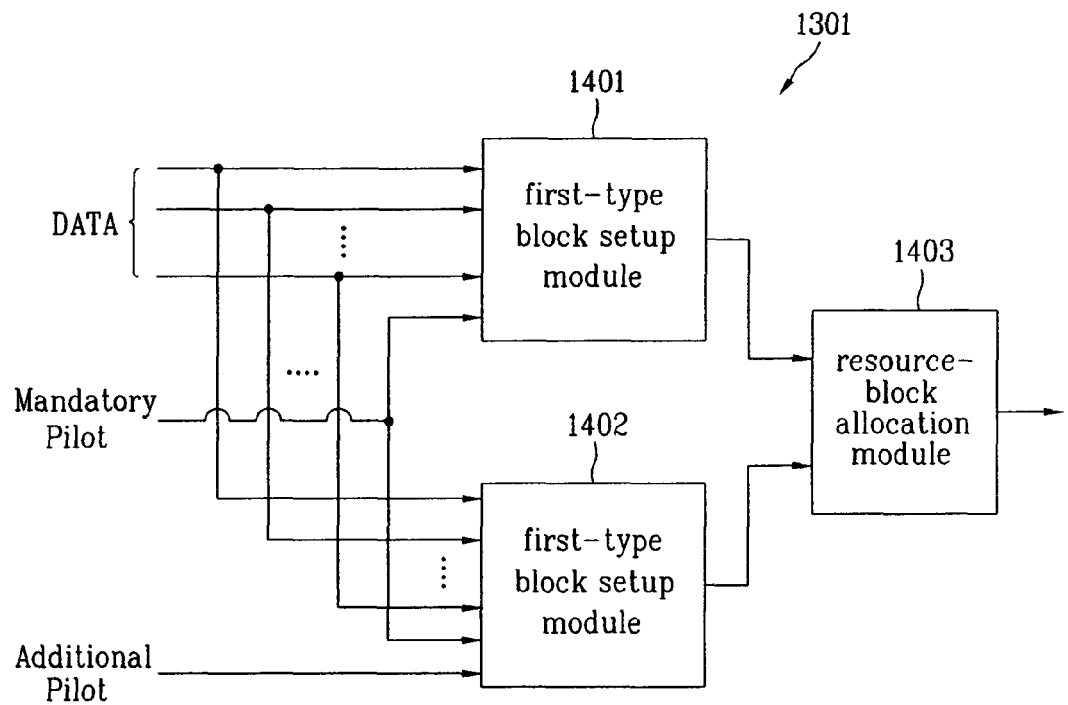
FIG. 14 is a block diagram illustrating a module for establishing/allocating the resource block according to one embodiment of the present invention.

FIG. 14 is a block diagram illustrating a module for establishing/allocating the resource block according to one embodiment of the present invention.

The sub-carrier mapping module of FIG. 13 arranges the mandatory pilot signal in the total time-frequency resource area according to the first pattern, and arranges the additional pilot signal to another time-frequency resource area for a user, who requests a channel estimation performance higher than the threshold value, according to the second pattern.

The sub-carrier mapping module 1301 according to the present invention controls the reference-signal density according to the user's channel estimation performance request, and this control operation of the sub-carrier mapping module 1301 is conducted in resource-block units. According to this embodiment of the present invention, the present invention allocates a first-type block having the high reference-signal density to a user who requests the high channel estimation performance, and allocates a second-type block having the low reference-signal density to another user who does not request the high channel estimation performance, so that the sub-carrier mapping module 1301 can be used as the apparatus for establishing/allocating the resource block.

An exemplary resource-block allocation apparatus 1301 is shown in FIG. 14. Referring to FIG. 14, the resource-block allocation apparatus 1301 includes a first-type block setup module 1401, a second-type block setup module 1402, and a resource-block allocation module 1403.

The first-type block setup module 1401 establishes a first-type block for arranging the mandatory pilot signal in the total time-frequency resource area according to the first pattern. The second-type block setup module 1402 arranges the mandatory pilot signal according to the first pattern, and then establishes a second-type block for arranging the additional pilot signal according to the second pattern. The resource-block allocation module 1403 allocates the first-type block to a user who requests the channel estimation performance less than the threshold value, and allocates the second-type block to another user who requests the channel estimation performance higher than the threshold value.

The first-type block setup module 1401 and the second-type setup module 1402 may be used as additional resource-block setup devices, so that they serve as a subject for allocating the resource. In addition, the first-type block setup module 1401 and the second-type setup module 1402 may also be used as the module for establishing the resource block having a variable density.

Figure 15:
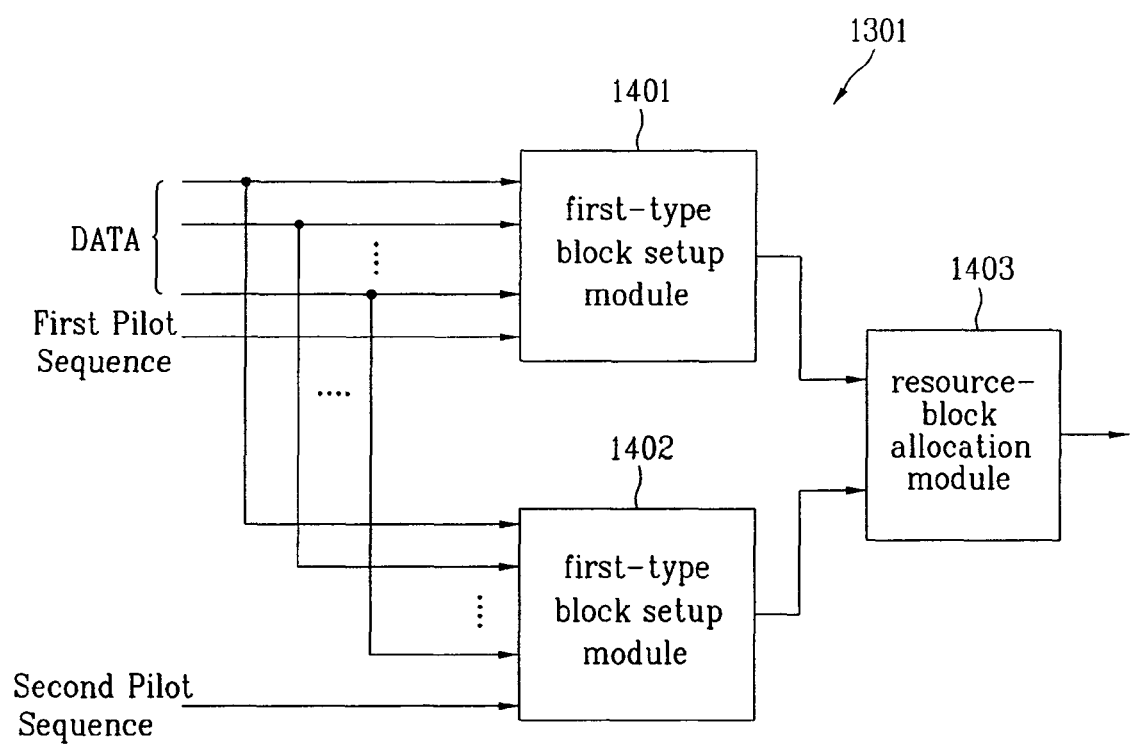
FIG. 15 is a block diagram illustrating a module for establishing/allocating the resource block according to another embodiment of the present invention.

FIG. 15 is a block diagram illustrating a module for establishing/allocating the resource block according to another embodiment of the present invention.

Referring to FIG. 14, the first-type block setup module 1401 receives a first reference signal sequence along with data, arranges them in the total time-frequency resource area according to the first pattern, so that it establishes a first-type block. The second-type block module 1402 receives the second reference-signal sequence along with data, arranges them in the total time-frequency resource area according to the second pattern, so that it establishes a second-type block. In this case, it is assumed that the second pattern has the reference-signal density higher than the first pattern.

The embodiment of FIG. 14 arranges the mandatory pilot signal according to the first pattern, so that it establishes a first-type block. The embodiment of FIG. 14 arranges the additional pilot signal in the first-type block according to the second pattern, so that it establishes a second-type block.

Differently from FIG. 14, the embodiment of FIG. 15 can establish the first-type block and the second-type block independent of each other. For example, the embodiment of FIG. 15 arranges the first reference pilot signal according to the first pattern, so that it establishes the first-type block. The embodiment of FIG. 15 arranges the second reference pilot signal according to the second pattern, which has the reference-signal density higher than that of the first pattern, so that it establishes the second-type block. The constituent sequence of the first and second reference pilot signals may be set to a predetermined sequence.

In the meantime, thereafter, the resource-block allocation module 1403 may allocate the first-type block to a first user who requests the high channel estimation performance, and may allocate the second-type block to a second user who requests the relatively-low channel estimation performance.

It should be noted that most terminology disclosed in the present invention is defined in consideration of functions of the present invention, and can be differently determined according to intention of those skilled in the art or usual practices. Therefore, it is preferable that the above-mentioned terminology be understood on the basis of all contents disclosed in the present invention.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

[Industrial Applicability]

As apparent from the above description, the present invention provides the method and apparatus for transmitting a reference signal, establishing a transmission pattern of the reference signal, and establishing/allocating the resource block. The present invention can establish a reference-signal transmission pattern to implement different reference-signal densities according to user's situations, so that an OFDM transmission system having multiple users (i.e., a multi-user) can effectively perform the channel estimation.

As a result, the present invention can prevent resources from being unnecessarily wasted, and can increase the channel estimation performance according to the user's situation, resulting in an increased production yield of a system.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method for transmitting a reference signal, the method comprising:
arranging at least one reference signal in a time-frequency resource area according to a first pattern, thereby generating a first-type block;
generating a second-type block having a reference-signal density higher than that of the first-type block; and
allocating the first-type block to a first user who requests a first channel estimation performance less than a threshold value,
allocating the second-type block to a second user who requests a second channel estimation performance equal to or higher than the threshold value, and
transmitting the reference signals according to said allocation, wherein:
the first pattern includes a lattice-type reference-signal arrangement pattern; and
the second pattern includes a specific pattern arranging additional reference signal at a specific location at which a time-axis interval and a frequency-axis interval of the reference signal, which has been arranged according to the first pattern, are compensated.

2. The method according to claim 1, wherein:
the threshold value is decided by not only a requested channel estimation performance but also an amount of data to be transmitted.

3. The method according to claim 1, wherein:
the user who requests the channel estimation performance equal to or higher than the threshold value includes at least one of a high-rate user having data rate higher than a predetermined data rate, a user for transmitting channels status information, a user who uses a MIMO (Multi-Input Multi-Output) scheme, and a user who uses a channel having a channel-selective characteristic higher than a predetermined threshold value.

4. The method according to claim 1, wherein:
location information of the first-type block and the second-type block is acquired from additional control information indicating the location for each user.

5. The method according to claim 1, further comprising:
location information of the first-type block and location information of the second-type block for each user,
a location of the second-type block is determined as a first location at which resource allocation is conducted by a distributed resource allocation scheme in a resource area for each user; and
a location of the first-type block is determined as a second location at which resource allocation is conducted by a localized resource allocation scheme in the resource area for each user.

6. A method for transmitting a reference signal, the method comprising:
arranging a reference signal to be transmitted via each of a plurality of antennas in a total time-frequency resource area according to a first pattern;
arranging an additional reference signal to be transmitted via each of the plurality of antennas in a time-frequency resource area for a user, who requests a channel estimation performance equal to or higher than a threshold value, according to a second pattern; and
transmitting the reference signal and the additional reference signal via the several antennas, wherein:
the first pattern includes a lattice-type reference-signal arrangement pattern; and
the second pattern includes a specific pattern arranging the additional reference signal at a specific location at which a time-axis interval and a frequency-axis interval of the reference signal, which has been arranged according to the first pattern, are compensated.

7. The method according to claim 6, wherein:
the reference signal and the additional reference signal transmitted via each of the plurality of antennas are multiplexed according to any one of a frequency division multiplexing (FDM) scheme, a time division multiplexing (TDM) scheme, and a code division multiplexing (CDM) scheme.

8. The method according to claim 7, wherein:
the multiplexing schemes of the reference signal and the additional reference signal are independent from each other.

9. An apparatus for transmitting a reference signal, the apparatus comprising:
a sub-carrier mapping means for mapping a plurality of parallel data streams and reference signals to a corresponding sub-carrier according to a predetermined mapping pattern; and
a signal conversion means for mapping an output signal of the sub-carrier mapping module to a time-area signal, and performing signal conversion, wherein:
the reference signals includes a first reference signal and an additional reference signal, and
the sub-carrier mapping means arranges the reference signal in a time-frequency resource area according to a first pattern, arranges the additional reference signal in a time-frequency resource area for a user, who requests a channel estimation performance equal to or higher than a threshold value, according to a second pattern, wherein:
the first pattern includes a lattice-type reference-signal arrangement pattern; and
the second pattern includes a specific pattern arranging the additional reference signal at a specific location at which a time-axis interval and a frequency-axis interval of the reference signal, which has been arranged according to the first pattern, are compensated.

10. An apparatus for establishing a resource block, the apparatus comprising:
a first-type block setup means for establishing a first-type block in which a reference signal is arranged in a time-frequency resource area according to a first pattern; and
a second-type block setup means for establishing a second-type block, in which the reference signal is arranged in the time-frequency resource area according to the first pattern and an one additional reference signal is arranged in the time-frequency resource area according to a second pattern, wherein:
the first pattern includes a lattice-type reference-signal arrangement pattern; and
the second pattern includes a specific pattern arranging the additional reference signal at a specific location at which a time-axis interval and a frequency-axis interval of the reference signal, which has been arranged according to the first pattern, are compensated.

11. An apparatus for allocating a reference block, the apparatus comprising:
a first-type block setup means for establishing a first-type block in which a reference signal is arranged in a time-frequency resource area according to a first pattern;
a second-type block setup means for establishing a second-type block, in which the reference signal is arranged in the time-frequency resource area according to the first pattern and an additional reference signal is arranged in the time-frequency resource area according to a second pattern; and a resource-block allocation means for allocating the first-type block to a first user who requests a first channel estimation performance less than a threshold value, and allocating the second-type block to a second user who requests a second channel estimation performance equal to or higher than the threshold value, wherein:

the first pattern includes a lattice-type reference-signal arrangement pattern; and the second pattern includes a specific pattern arranging the additional reference signal at a specific location at which a time-axis interval and a frequency-axis interval of the reference signal, which has been arranged according to the first pattern, are compensated.

12. An apparatus for establishing a reference block, the apparatus comprising:

a first-type block setup means for establishing a first-type block in which a first reference signal is arranged in a time-frequency resource area according to a first pattern; and a second-type block setup means for establishing a second-type block, in which a second reference signal is arranged in the time-frequency resource area according to a second pattern, in which the first pattern has a reference-signal density higher than that of the second pattern, wherein:

the first pattern includes a lattice-type reference-signal arrangement pattern; and the second pattern includes a specific pattern arranging the second reference signal at a specific location at which a time-axis interval and a frequency-axis interval of the first reference signal, which has been arranged according to the first pattern, are compensated.

13. An apparatus for allocating a resource block, the apparatus comprising:

a first-type block setup means for establishing a first-type block in which a first reference signal is arranged in a time-frequency resource area according to a first pattern;

a second-type block setup means for establishing a second-type block, in which a second reference signal is arranged in a time-frequency resource area according to a second pattern; and a resource-block allocation means for allocating the first-type block to a first user who requests a first channel estimation performance less than a threshold value, and allocating the second-type block to a second user who requests a second channel estimation performance equal to or higher than the threshold value, in which the first pattern has a reference-signal density higher than that of the second pattern, wherein:

the first pattern includes a lattice-type reference-signal arrangement pattern; and the second pattern includes a specific pattern arranging the second reference signal at a specific location at which a time-axis interval and a frequency-axis interval of the first reference signal, which has been arranged according to the first pattern, are compensated.

* * * * *